March 23, 1954 — S. GYNT — 2,673,302
GOVERNOR GENERATOR
Filed May 22, 1952

INVENTOR.
Sven Gynt
BY
Attorney.

Patented Mar. 23, 1954

2,673,302

UNITED STATES PATENT OFFICE 2,673,302

GOVERNOR GENERATOR

Sven Gynt, Vasteras, Sweden, assignor to Allmänna Svenska Elektriska Aktiebolaget, Vasteras, Sweden, a corporation of Sweden Application May 22, 1952, Serial No. 289,379

4 Claims. (Cl. 310—156)

The invention relates to rotors for dynamo-electric machines utilizing permanent magnets, and more especially to rotors for use in governor-generators for turbines.

In the past, the speed of turbines in electric power stations has been regulated either by centrifugal governors driven through a belt from the turbine shaft or by motors fed by generators arranged on the turbine shaft. The latter is often referred to as a governor-generator.

Since the purpose of the governor is to control the speed of the turbine, and especially to prevent racing under no-load conditions, it is essential that it be driven from some source which is not rendered inoperative by a power failure. Therefore the current developed by the power station cannot be used to drive the governor, but instead the use of a separate current source is necessary. In recent years the development of improved materials for making permanent magnets has made it possible to use such magnets on a rotor driven by the turbine as the field magnets of governor-generators.

Permanent magnet steel cannot be machined except by grinding, and is rather brittle in addition to being very hard. For these reasons, the magnets must be given a very simple shape, and some sort of clamping device must be used to hold them in place on the rotor. In addition, because of their brittleness, there is always danger that the magnets will burst under the centrifugal and other forces to which they are subjected when in use.

The primary object of the present invention is to provide an improved permanent magnet rotor for dynamo-electric machines, and especially for governor-generators, which is more satisfactory in use than those heretofore known.

Another object of the invention is to provide a mounting for permanent magnets which will prevent damage if the magnets break up when in use.

An additional object of the invention is to provide for mounting the magnets on a rotor which allows the use of a simple form of magnet and requires little machining thereof.

Still another object of the invention is to provide an arrangement which prevents the demagnetization of the magnets if the generator is short circuited. More especially, the object is to provide such a means which also performs the function of protecting against damage if the magnet bursts or breaks up.

According to the specific form of the invention shown herein, the magnets are formed as bars with two opposite surfaces ground flat. These flat surfaces are clamped between flat surfaces on the core or pole center and on a pole shoe which is secured to the core or pole center by bolts. An electrically conducting but non-magnetic sleeve surrounding each magnet is also clamped between the pole shoe and the pole center. The bolts lie outside the magnet but may be inside the sleeve. The sleeves are resiliently compressible radially of the rotor so that clamping engagement between the pole center and core and the magnet can be assured. This may be accomplished by providing slits in the sleeves in planes parallel to the axis of the rotor.

Further objects and advantages of the invention will appear more fully from the following description, especially when taken in conjunction with the accompanying drawings which form a part thereof.

Figure 1:
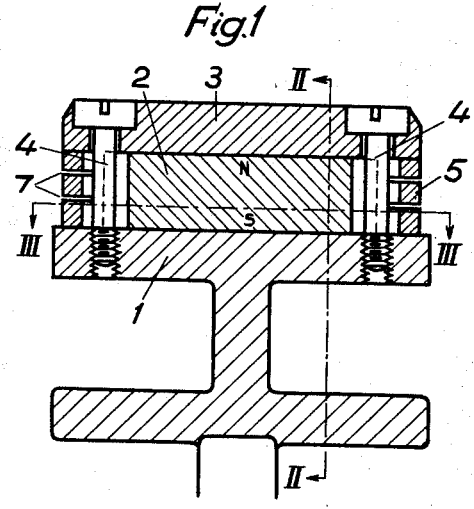
Fig. 1 is a cross-section through a part of a rotor showing an embodiment of the invention.
Figure 2:
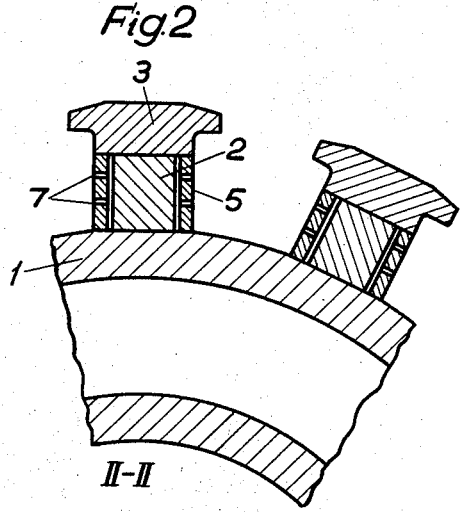
Figs. 2 and 3 are cross-sections on the lines II—II and III—III respectively of Fig. 1.
Figure 3:
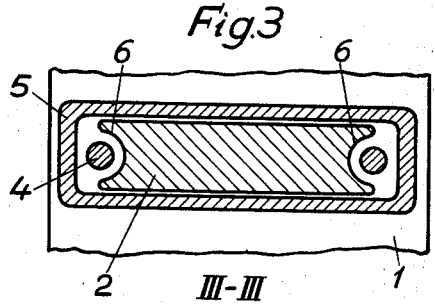
Figure 4:
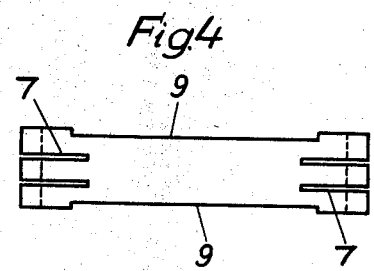
Fig. 4 shows in side elevation and Fig. 5 in end view the sleeve of Figs. 1 to 3.
Figure 5:
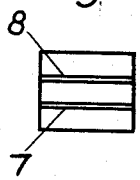

In the modification of Figs. 1 to 5, 1 is the pole center or core. On the outside of this core are positioned a plurality of permanent magnets, such as 2. The core is provided with flat surfaces against which flat faces of the magnets rest. Overlying each magnet is a pole shoe 3 which is secured to the core by bolts 4. Clamped between pole shoe 3 and core 1 and surrounding each magnet is a sleeve 5. This sleeve is formed of highly electrically conductive but non-magnetic material.

Preferably the ends of the magnets are provided with grooves 6, bolts 4 lying at least partly within these grooves. On the other hand, the bolts are inside the sleeves 5.

The magnet 2 is machined only on its upper and lower surfaces to the extent necessary to allow it to be clamped tightly between the pole shoe 3 and the core 1, when sleeve 5 is in position.

In order to ensure clamping of the magnet 2 in position, even when sleeve 5 is slightly higher than the thickness of the magnet, this sleeve is preferably made resiliently compressible radially of the rotor. For this purpose, the sleeve is provided with slits 7 in its end portions, while the upper and lower edges of the longer sides are cut away as at 9. This allows the sleeve to be compressed somewhat when bolts 4 are tightened. On the other hand, the slits will not prevent the flow of the current which counteracts demagnetization upon large current changes in the stator, for example if the generator is short-circuited.

Figure 6:
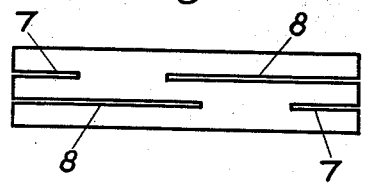
Fig. 6 shows in side elevation a modified form of sleeve.

In the modification of Fig. 6, sleeve 5 is of equal height all around its periphery. In addition to slots 7, however, there are longer slots 8 which extend far enough from opposite ends along the longer sides to overlap each other.

While some embodiments of the invention have been described herein, it is to be understood that they are not intended as limitations except within the scope of the claims hereto or hereinafter appended.

I claim as my invention:

1. A rotor for electric machines, comprising a pole center, the outer surface of said center being provided with flat portions, radially disposed permanent magnet blocks in contact with said flat portions, pole shoes in close contact with said magnet blocks, bolts traversing said pole shoes and threaded into said pole center, and a resiliently compressible metal sleeve located between each of said shoes and one of said flat portions and surrounding each magnet block.

2. A rotor for electric machines, comprising a pole center with an outer surface provided with flat portions, radially disposed permanent magnet blocks in contact with said flat portions, pole shoes in close contact with said magnet blocks, bolts traversing said pole shoes and threaded into said pole center, and a resiliently compressible metal sleeve surrounding each magnetic block and inserted between each of said pole shoes and one of said flat portions, and said metal sleeves being each provided with a plurality of slits parallel to one of said flat portions.

3. A rotor for electric machines, comprising a pole center with an outer surface provided with flat portions, radially disposed permanent magnet blocks in contact with said flat portions, a pole shoe in close contact with each of said magnet blocks, bolts traversing each pole shoe and threaded into said pole center, and resiliently compressible metal sleeves inserted between said pole shoes and said flat portions each of said magnet blocks being surrounded by one of said metal sleeves, and a plurality of slits overlapping each other and disposed in said sleeves in parallel relation to the said flat portions adjacent thereto.

4. A rotor for electric machines, comprising a pole center, the outer surface of said center being provided with flat portions, radially disposed permanent magnet blocks in contact with said flat portions, pole shoes in close contact with said magnet blocks, bolts traversing said pole shoes and threaded into said pole center, and a resiliently compressible metal sleeve inserted between each pole shoe and one of said flat portions and surrounding each magnet block, each of said metal sleeves being provided with a plurality of slits parallel to one of said flat portions, and each sleeve being recessed so that it makes contact with one of said flat portions and one of said pole shoes only at opposite portions of the end surfaces of the sleeve.

SVEN GYNT.

References Cited in the file of this patent

UNITED STATES PATENTS

| Number | Name | Date |
|---|---|---|
| 2,407,883 | Jackson | Sept. 17, 1946 |
| 2,418,980 | Morrill | Apr. 15, 1947 |
| 2,475,776 | Brainard | July 16, 1949 |
| 2,516,901 | Morrill | Aug. 1, 1950 |

FOREIGN PATENTS

| Number | Country | Date |
|---|---|---|
| 217,877 | Switzerland | Feb. 16, 1942 |